UNITED STATES PATENT OFFICE.

ALBERT BAUR, OF GISPERSLEBEN, NEAR ERFURT, GERMANY.

ARTIFICIAL MUSK.

SPECIFICATION forming part of Letters Patent No. 451,847, dated May 5, 1891.

Application filed January 15, 1891. Serial No. 377,910. (Specimens.)

*To all whom it may concern:*

Be it known that I, ALBERT BAUR, a subject of the Emperor of Germany, residing in Gispersleben, near Erfurt, Germany, have invented certain new and useful Improvements in Artificial Musk, of which the following specification is a full, clear, and exact description.

The present invention relates to a new product or compound termed "artificial musk," which is characterized by the same fine and penetrating order as natural musk, and is adapted to be substituted therefor.

In Letters Patent No. 416,710, granted to me December 10, 1889, I have described and claimed a certain process of making artificial musk by mixing toluene with a halogen compound of butyl, such as butyl-chloride, butyl-iodide, or butyl-bromide, and with aluminium bromide or chloride, distilling the compound, treating the vapors with fuming nitric and sulphuric acid, dissolving in alcohol, and then crystallizing. The product thus obtained, whose properties and characteristics are hereinafter fully defined, is a solid crystalline body and is chemically a trinitrated hydrocarbon. Its formula is

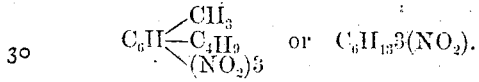

To produce the artificial musk which constitutes the present invention it is not necessary to proceed in the manner above described. It may be made by various processes. For example, instead of taking as a base toluene, I employ xylene or other similar substance and mix first with a butyl halogen compound. The resulting compound, such as isobutyl-xylene, the formula of which is $C_{12}H_{18}$, when treated with fuming nitric and sulphuric acid under the conditions above stated, will yield a mixture of nitrated bodies, from which by a fresh nitration a trinitrated body can be separated, the formula of which is

This product possesses the same odor as that obtained from toluene, but in a lower degree.

In producing the product claimed herein, whether toluene, xylene, or other substance be taken as the base, I may proceed by employing hydrocarbons of the propyl or amyl series. For example, the artificial musk may be obtained by treating with fuming nitric and fuming sulphuric acid one or the other of the following bodies:

1. Toluene $\begin{cases} \text{methyl-isopropyl-benzine,} \\ \text{methyl-isobutyl-benzine,} \\ \text{methyl-isoamyl-benzine.} \end{cases}$ 2. Xylene $\begin{cases} \text{dimethyl-isopropyl-benzine,} \\ \text{dimethyl-isolutyl-benzine,} \\ \text{dimethyl-isoamyl-benzine.} \end{cases}$ The present invention, being independent of any process of manufacture, may be obtained in other ways than those herein described, they being given merely as examples of mode of procedure by which the artificial musk may be made.

The said new compound or product, while resembling natural musk in its odor, is in other respects very different therefrom. The former is a nitrated product, while the analysis of the secretion found in the pouch of the animal does not show any nitrated substance. The new product is also readily distinguished from the brown oils which have been offered on the market as a substitute for natural musk, and which, if they vaguely suggest the smell of musk, smell also of the nitric acid employed in their preparation. The said product is further distinguished from the oils above referred to in that it has the form of fine crystals of a slightly yellowish color. These crystals are insoluble in water, but are soluble in alcohol, ether, and chloroform.

The product may be distinguished from other hydrocarbons by the characteristic odor above described, by its solid crystalline form, and by its chemical constitution, being a special compound of hydrocarbon with nitric acid, containing always three molecules of nitrated residue, $(NO_2.)$

Having now fully described my said invention, what I claim is—

The artificial musk herein described, being a trinitrated hydrocarbon derived from toluene or its homologues in solid crystalline form characterized by the odor of natural musk, as set forth.

In witness whereof I have hereunto signed my name in the presence of two subscribing witnesses.

ALBERT BAUR.

Witnesses:
GEORGE GIFFORD,
B. NIETSKI,
W. HERZBERG.

DISCLAIMER.

451,847.—*Albert Baur*, Gispersleben, near Erfurt, Germany. IMPROVEMENT IN ARTIFICIAL MUSK. Patent dated May 5, 1891. Disclaimer filed February 21, 1902, by the present assignee, the *Societe Fabriques de Produits Chimiques de Thann et de Mulhouse*.

Enters its disclaimer—

"To that part of the description of the said patent which is found in lines 35-36 thereof in the following words, to wit:

'It may be made by various processes.'"

Also—

"To that part of the description of the said patent which is found in lines 37-38 of the said patent in the following words, to wit:

'or other similar substance.'"

Also—

"To that part of the description of the said patent contained in lines 53-74 thereof as far as the same refers to any substance except 'methyl-isobutyl-benzine' and except 'dimethyl-isobutyl-benzine.'"

Also—

"To any claim to the artificial musk herein described when derived from 'methyl-isopropyl-benzine,' or when derived from 'methyl-isoamyl-benzine,' or when derived from 'dimethyl-isopropyl-benzine,' or when derived from 'dimethyl-isoamyl-benzine,' or when derived from any other base or substance but from 'methyl-isobutyl-benzine,' (that is, 'isobutyl-toluene,' commonly called 'butyl-toluene,') or 'dimethyl-isobutyl-benzine,' (that is, 'isobutyl-xylene,' commonly called 'butyl-xylene,') and * * * claims only the trinitrated hydrocarbon derived from the said 'methyl-isobutyl-benzine' ('isobutyl-toluene,' commonly called 'butyl-toluene') or derived from 'dimethyl-isobutyl-benzine,' ('isobutyl-xylene,' commonly called 'butyl-xylene.')"—

[*Official Gazette, March 4, 1902.*]

DISCLAIMER.

451,847.—*Albert Baur*, Gispersleben, near Erfurt, Germany. IMPROVEMENT IN ARTIFICIAL MUSK. Patent dated May 5, 1891. Disclaimer filed February 21, 1902, by the present assignee, the *Societe Fabriques de Produits Chimiques de Thann et de Mulhouse*.

Enters its disclaimer—

"To that part of the description of the said patent which is found in lines 35-36 thereof in the following words to wit:

'It may be made by various processes.'"

Also—

"To that part of the description of the said patent which is found in lines 37-38 of the said patent in the following words, to wit:

'or other similar substance.'"

Also—

"To that part of the description of the said patent contained in lines 53-74 thereof as far as the same refers to any substance except 'methyl-isobutyl-benzine' and except 'dimethyl-isobutyl-benzine.'"

Also—

"To any claim to the artificial musk herein described when derived from 'methyl-isopropyl-benzine,' or when derived from 'methyl-isoamyl-benzine,' or when derived from 'dimethyl-isopropyl-benzine,' or when derived from 'dimethyl-isoamyl-benzine,' or when derived from any other base or substance but from 'methyl-isobutyl-benzine,' (that is, 'isobutyl-toluene,' commonly called 'butyl-toluene,') or 'dimethyl-isobutyl-benzine,' (that is, 'isobutyl-xylene,' commonly called 'butyl-xylene,') and * * * claims only the trinitrated hydrocarbon derived from the said 'methyl-isobutyl-benzine' ('isobutyl-toluene,' commonly called 'butyl-toluene') or derived from 'dimethyl-isobutyl-benzine,' ('isobutyl-xylene,' commonly called 'butyl-xylene.')"—

[*Official Gazette, March 4, 1902.*]